United States Patent
Shirai et al.

(10) Patent No.: US 7,332,219 B2
(45) Date of Patent: Feb. 19, 2008

(54) TAPE-SHAPED INSULATING MATERIAL, INSULATED PRODUCT AND AQUEOUS DISPERSION TYPE ACRYLIC PRESSURE-SENSITIVE ADHESIVE FOR INSULATING MATERIAL

(75) Inventors: Mitsuyoshi Shirai, Ibaraki (JP); Natsuko Okumura, Ibaraki (JP); Michirou Kawanishi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 251 days.

(21) Appl. No.: 10/485,019

(22) PCT Filed: Jul. 25, 2002

(86) PCT No.: PCT/JP02/07534

§ 371 (c)(1),
(2), (4) Date: Jan. 28, 2004

(87) PCT Pub. No.: WO03/015107

PCT Pub. Date: Feb. 20, 2003

(65) Prior Publication Data

US 2004/0213992 A1    Oct. 28, 2004

(30) Foreign Application Priority Data

| Aug. 2, 2001 | (JP) | 2001-234617 |
| Mar. 5, 2002 | (JP) | 2002-058632 |
| Jul. 22, 2002 | (JP) | 2002-212390 |

(51) Int. Cl.
   *B32B 7/12*    (2006.01)
(52) U.S. Cl. .................. 428/355 AC; 428/355 EN; 526/329.5; 525/301; 525/308
(58) Field of Classification Search ......... 428/355 AC, 428/355 EN; 526/329.5; 525/301, 308
See application file for complete search history.

(56) References Cited

U.S. PATENT DOCUMENTS

| 4,983,656 A | * | 1/1991 | Ito et al. ..................... 524/109 |
| 6,156,378 A | * | 12/2000 | Koketsu et al. .......... 427/208.4 |
| 6,518,342 B1 | * | 2/2003 | Tanaka et al. .............. 524/270 |
| 6,984,413 B2 | * | 1/2006 | Yamamoto et al. ....... 427/208.4 |

FOREIGN PATENT DOCUMENTS

| EP | 0 464 454 | 1/1992 |
| EP | 0 472 837 | 3/1992 |
| EP | 1 108 770 A2 | 6/2001 |
| JP | 01-170677 | 7/1989 |
| JP | 04-050204 | 2/1992 |
| JP | 04-053802 | 2/1992 |
| JP | 11-050033 | 2/1999 |
| JP | 2000-109784 | 4/2000 |

\* cited by examiner

*Primary Examiner*—Margaret G. Moore
(74) *Attorney, Agent, or Firm*—Knobbe Martens Olson & Bear LLP

(57) ABSTRACT

A tape-shaped insulating material comprises an insulating substrate and a pressure-sensitive adhesive layer provided on one side or both sides of the substrate, wherein the pressure-sensitive adhesive layer is made of an aqueous dispersion type acrylic pressure-sensitive adhesive containing a polymer emulsion that is a product of emulsion polymerization of a monomer mainly composed of $C_4$ to $C_{12}$ alkyl(meth)acrylate ester in the presence of an emulsifying agent. The tape-shaped insulating material has an electrolytic corrosion coefficient according to JIS C-2338 of 0.98 or more, and the pressure-sensitive adhesive layer has good insulating characteristics.

12 Claims, No Drawings

TAPE-SHAPED INSULATING MATERIAL, INSULATED PRODUCT AND AQUEOUS DISPERSION TYPE ACRYLIC PRESSURE-SENSITIVE ADHESIVE FOR INSULATING MATERIAL

This application is the U.S. National Phase under 35 U.S.C. §371 of International Application PCT/JP02/07534, filed on Jul. 25, 2002, which claims priority of Japanese Patent Application Nos. 2001-234617, 2002-58632, 2002-212390, filed on Aug. 2, 2001, Mar. 5, 2002 and Jul. 22, 2002 respectively. The International Application was published under PCT Article 21(2) in a language other than English.

TECHNICAL FIELD

The invention relates to a tape-shaped insulating material and an insulated product comprising the tape-shaped insulating material attached. The invention also relates to an aqueous dispersion type acrylic pressure-sensitive adhesive, which is for use in an insulating material and can form a pressure-sensitive adhesive layer for the tape-shaped insulating material. The tape-shaped insulating material according to the invention can be used as an interlayer or armor insulation for electrical or electronic components such as transformers and coils and the like to make them insulated products.

BACKGROUND ART

Conventional pressure-sensitive adhesives for use in tape-shaped insulating materials include acrylic or rubber-based solvent type pressure-sensitive adhesives, which have good insulating characteristics. Similarly to general pressure-sensitive adhesives, however, such pressure-sensitive adhesives for use in tape-shaped insulating materials can also be a subject of public demands or a subject of enhancement of regulations concerning environmental protection, resource saving, safety and sanitation, or the like, and therefore development of solvent-free materials has been an important task. Thus, there has been a demand for alternatives to the solvent type pressure-sensitive adhesives. As the alternative to the solvent type pressure-sensitive adhesives, water-based pressure-sensitive adhesives can be superior to hot-melt or curing type pressure-sensitive adhesives in terms of general versatility and potential applications and developments.

However, the conventional water-based pressure-sensitive adhesive such as an aqueous dispersion type natural or synthetic rubber latex contains a very large amount of a water-soluble ionic emulsifying agent and therefore has a problem of degradation of insulating characteristics. On the other hand, there are some aqueous dispersion type acrylic pressure-sensitive adhesives, which contain a polymer emulsion produced by polymerizing a monomer mainly composed of an alkyl(meth)acrylate ester in the presence of an emulsifying agent. In the process of such a polymer, a functional group-containing monomer, which is co-polymerizable with the main component, or any other modifier monomer is added for the purpose of increasing the adhesive strength to the adherend, introducing crosslinking points for post-crosslinking of the resulting polymer, or enhancing the cohesion of the pressure-sensitive adhesive. However, the known aqueous dispersion type acrylic pressure-sensitive adhesives have the problem that their insulating characteristics can be degraded under humidified conditions.

It is an object of the invention to provide a tape-shaped insulating material comprising a water-based pressure-sensitive adhesive layer that is provided on one side or both sides of an insulating substrate and has good insulating characteristics. It is another object of the invention to provide an insulated product comprising the tape-shaped insulating material attached.

It is yet another object of the invention to provide a water-based pressure-sensitive adhesive layer having good insulating characteristics and to provide an aqueous dispersion type acrylic pressure-sensitive adhesive that is for use in insulating materials and can form a water-based pressure-sensitive adhesive layer having good insulating characteristics.

DISCLOSURE OF INVENTION

The inventors have made active investigations to solve the above problems and found that the above objects can be achieved by using the water-based pressure-sensitive adhesive as shown below in the process of forming a water-based pressure-sensitive adhesive layer for the tape-shaped insulating material. Based on the finding, the inventors have made the present invention.

Thus, the invention is directed to a tape-shaped insulating material comprising an insulating substrate and a pressure-sensitive adhesive layer provided on one side or both sides of the substrate, wherein the pressure-sensitive adhesive layer is made of an aqueous dispersion type acrylic pressure-sensitive adhesive containing a polymer emulsion that is a product of emulsion polymerization of a monomer in the presence of an emulsifying agent, wherein the monomer comprises, as a main component, alkyl(meth)acrylate ester wherein the alkyl group has 4 to 12 carbon atoms; and the tape-shaped insulating material has an electrolytic corrosion coefficient according to JIS C-2338 of 0.98 or more.

In the invention, the aqueous dispersion type acrylic pressure-sensitive adhesive is used as the water-based pressure-sensitive adhesive in an amount of the emulsifying agent. Therefore, the product according to the invention can be free from insulating characteristic degradation, which would otherwise be caused by a high content of the ionic emulsifying agent such as the natural or synthetic rubber latex pressure-sensitive adhesive. In addition, an electrolytic corrosion coefficient according to JIS C-2338 of 0.98 or more can provide good insulating characteristics. The electrolytic corrosion coefficient is preferably 0.99 or more.

Preferably, the pressure-sensitive adhesive layer of the tape-shaped insulating material contains 3% by weight or less of a water-extractable component.

In the tape-shaped insulating material, the pressure-sensitive adhesive layer may be controlled so as to contain 3% by weight or less of the water-extractable component. Such an insulating material can have sufficient insulating characteristics even under humidified conditions. The amount of the water-extractable component is preferably as small as possible and preferably 2% by weight or less, more preferably 1% by weight or less. If the amount of the water-extractable component is more than 3% by weight, the water-extractable component can move to an anode or a cathode when a voltage is applied to the material under humidified conditions, so that the insulating characteristics can be degraded. The amount of the water-extractable component is specifically a value that can be calculated according to the method as described in the section of Examples.

Preferably, the pressure-sensitive adhesive layer of the tape-shaped insulating material is made of an aqueous dispersion type acrylic pressure-sensitive adhesive containing a polymer emulsion that is a product of emulsion polymerization of a monomer in the presence of an emulsifying agent, wherein the monomer comprises, as a main component, alkyl(meth)acrylate ester wherein the alkyl group has 4 to 12 carbon atoms, and the monomer contains a carboxyl group-containing monomer having a distribution index of 1 or more, wherein the distribution index represents a weight ratio of a toluene solution of the carboxyl group-containing monomer to a water solution of the carboxyl group-containing monomer after the toluene, the water and the carboxyl group-containing monomer each having the same weight are mixed.

In the process of the polymer emulsion to be contained in the aqueous dispersion type acrylic pressure-sensitive adhesive, the carboxyl group-containing monomer having a distribution index of 1 or more may be added as a functional group-containing monomer co-polymerizable with the main component, for the purpose of increasing the adhesive strength to the adherend, introducing crosslinking points for post-crosslinking of the resulting polymer, or enhancing the cohesion of the pressure-sensitive adhesive. The resulting polymer emulsion can have good adhesion properties and sufficient insulating characteristics even under humidified conditions. The distribution index is preferably as high as possible and preferably 1.4 or more, more preferably 1.8 or more. If a carboxyl group-containing monomer with a distribution index of less than 1 is used in the process of emulsion polymerization, the carboxyl group-containing monomer may fail to be copolymerized in the micelle of the emulsifying agent and can be polymerized in water to form a homopolymer or near-homo polymer (hereinafter referred to as the homopolymer), which can move to an anode or a cathode and tend to degrade the insulating characteristics when a voltage is applied under humidified conditions. The distribution index represents a value of a weight ratio of a toluene solution layer to a water solution layer (toluene solution/water solution), wherein the weight ratio is obtained after the carboxyl group-containing monomer, the water and the toluene each having the same amount (weight) are mixed. Specifically, the value is calculated by the method as described in the section of Examples.

The carboxyl group-containing monomer having a distribution index of 1 or more is preferably methacrylic acid. Methacrylic acid can advantageously reduce the amount of the homopolymer product.

Preferably, the pressure-sensitive adhesive layer of the tape-shaped insulating material is made of an aqueous dispersion type acrylic pressure-sensitive adhesive containing a polymer emulsion that is a product of emulsion polymerization of a monomer in the presence of an emulsifying agent, wherein the monomer comprises, as a main component, alkyl(meth)acrylate ester wherein the alkyl group has 4 to 12 carbon atoms, and the polymer emulsion has an average particle diameter of 0.4 μm or less.

In general, the polymer emulsion contained in the aqueous dispersion type acrylic pressure-sensitive adhesive has an average particle diameter in the range from 0.1 to 1 μm. However, the emulsion particles having an average particle diameter of 0.4 μm or less can be closest-packed so that a defect-free pressure-sensitive adhesive layer can be formed even without a severe aging condition (drying condition). The closest packing can provide a reduced volume of the space between the particles and provide a uniform distribution of the ion component existing in the space. The emulsion particles having an average particle diameter of 0.4 μm or less can also provide an increased total area of the surface layer so that the amount of the ion component existing in a unit area of the surface layer can be reduced and therefore the ion component can uniformly be distributed in the pressure-sensitive adhesive layer. The ion component uniformly distributed in the pressure-sensitive adhesive layer can be rapidly diffused over the pressure-sensitive adhesive layer. Therefore, the pressure-sensitive adhesive layer can have a reduced water absorption property and can have sufficient insulating characteristics even under humidified conditions because the ion component can be diffused over the pressure-sensitive adhesive layer so as to provide a reduced ionic conduction. The average particle diameter of the emulsion is preferably as small as possible and preferably 0.35 μm or less, more preferably 0.3 μm or less. If the emulsion has an average particle diameter of more than 0.4 μm, under a voltage applied under humidified conditions, the pressure-sensitive adhesive layer may absorb water or the ion component may exist in a large amount in the space between the emulsion particles or on the surface layer of the emulsion particles, so that the ion component can move to the anode or cathode to degrade the insulating characteristics.

In the tape-shaped insulating material, the amount of the emulsifying agent used in the production of the polymer emulsion to be contained in the aqueous dispersion type acrylic pressure-sensitive adhesive is preferably from 0.3 to 5 parts by weight based on 100 parts by weight of the monomer.

In the tape-shaped insulating material, the emulsifying agent used in the preparation of the polymer emulsion to be contained in the aqueous dispersion type acrylic pressure-sensitive adhesive is preferably a radical-polymerizable emulsifying agent, which can advantageously reduce the amount of the water-extractable component.

The invention is also directed to an insulated product comprising the tape-shaped insulating material attached.

The invention is also directed to an aqueous dispersion type acrylic pressure-sensitive adhesive for an insulating material, comprising a copolymer emulsion that is a product of emulsion polymerization of a monomer in the presence of an emulsifying agent, wherein the monomer comprises, as a main component, alkyl(meth)acrylate ester wherein the alkyl group has 4 to 12 carbon atoms, and the monomer contains a carboxyl group-containing monomer having a distribution index of 1 or more, wherein the distribution index represents a weight ratio of a toluene solution of the carboxyl group-containing monomer to a water solution of the carboxyl group-containing monomer after the toluene, the water and the carboxyl group-containing monomer each having the same weight are mixed.

In the aqueous dispersion type acrylic pressure-sensitive adhesive for the insulating material, the carboxyl group-containing monomer having a distribution index of 1 or more is preferably methacrylic acid.

The invention is also directed to an aqueous dispersion type acrylic pressure-sensitive adhesive for an insulating material, comprising a polymer emulsion that is a product of emulsion polymerization of a monomer in the presence of an emulsifying agent, wherein the monomer comprises, as a main component, alkyl(meth)acrylate ester wherein the alkyl group has 4 to 12 carbon atoms, and the polymer emulsion has an average particle diameter of 0.4 μm or less.

In the aqueous dispersion type acrylic pressure-sensitive adhesive for the insulating material, the amount of the emulsifying agent used in the preparation of the polymer emulsion is preferably from 0.3 to 5 parts by weight based on 100 parts by weight of the monomer.

In the aqueous dispersion type acrylic pressure-sensitive adhesive for the insulating material, the emulsifying agent used in the preparation of the polymer emulsion is preferably a radical-polymerizable emulsifying agent, which can advantageously reduce the amount of the water-extractable component.

The invention is also directed to a pressure-sensitive adhesive layer for use in an insulating material, which is made of the aqueous dispersion type acrylic pressure-sensitive adhesive for the insulating material. The amount of the water-extractable component in the pressure-sensitive adhesive layer for use in the insulating material is preferably 3% by weight or less.

BEST MODE FOR CARRYING OUT THE INVENTION

In the tape-shaped insulating material according to the invention, the aqueous dispersion type acrylic pressure-sensitive adhesive, which forms the pressure-sensitive adhesive layer, comprises a polymer emulsion that is a product of emulsion polymerization of a monomer in the presence of an emulsifying agent, wherein the monomer comprises, as a main component, alkyl(meth)acrylate ester wherein the alkyl group has 4 to 12 carbon atoms.

The alkyl(meth)acrylate ester, wherein the alkyl group has 4 to 12 carbon atoms, may be an ester of acrylic or methacrylic acid and an alcohol having 4 to 12 carbon atoms. Examples of such an ester include butyl(meth)acrylate, 2-ethylhexyl(meth)acrylate, isononyl(meth)acrylate, lauryl(meth)acrylate, cyclopentyl(meth)acrylate, cyclohexyl(meth)acrylate, and isobornyl(meth)acrylate. One of these esters may be used alone, or two or more of these esters may be used in combination. In the monomer, the alkyl(meth)acrylate ester may be contained as a main component of the monomer at a concentration of 50% by weight or more, preferably 80% by weight or more, more preferably 90 to 99.9% by weight. If the concentration of the alkyl(meth)acrylate ester is low, a pressure-sensitive adhesive with good adhesion property can be hard to produce.

Together with the alkyl(meth)acrylate ester, the monomer may contain an appropriate amount of a functional group-containing monomer, which is co-polymerizable with the alkyl(meth)acrylate ester, or an appropriate amount of any other modifier monomer, for the purpose of increasing the adhesive strength to the adherend, introducing crosslinking points for post-crosslinking of the resulting polymer, or enhancing the cohesion of the pressure-sensitive adhesive. The functional group-containing monomer may be used in such an amount that a monomer mixture of it and the $C_4$ to $C_{12}$ alkyl(meth)acrylate ester provides a total of 100% by weight. The functional group-containing monomer may be used at a concentration of generally 50% by weight or less, preferably 20% by weight or less, more preferably 0.5 to 10% by weight.

Examples of the functional group-containing monomer include a carboxyl group-containing monomer such as acrylic acid, methacrylic acid, itaconic acid, maleic acid, and crotonic acid; a hydroxyl group-containing monomer such as 2-hydroxyethyl(meth)acrylate, 2-hydroxypropyl(meth)acrylate and 2-hydroxybutyl(meth)acrylate; an amide group-containing monomer such as (meth)acrylamide, N,N-dimethyl(meth)acrylamide, N-methylol(meth)acrylamide, N-methoxymethyl(meth)acrylamide, and N-butoxymethyl(meth)acrylamide; an amino group-containing monomer such as 2-(N,N-dimethylamino)ethyl(meth)acrylate; a glycidyl group-containing monomer such as glycidyl(meth)acrylate; a multifunctional alkoxysilane such as trimethoxysilane propyl(meth)acrylate, dimethoxysilane propyl(meth)acrylate and triethoxysilane propyl(meth)acrylate; (meth)acrylonitrile; N-(meth)acryloylmorpholine; and N-vinyl-2-pyrolidone. The functional group-containing monomer may be used alone, or two or more functional group-containing monomers may be used in combination.

The functional group-containing monomer co-polymerizable with the alkyl(meth)acrylate ester is preferably the carboxyl group-containing monomer. In particular, the carboxyl group-containing monomer preferably has a distribution index of 1 or more. The carboxyl group-containing monomer with a distribution index of 1 or more may be used in such an amount that a monomer mixture of it and the $C_4$ to $C_{12}$ alkyl(meth)acrylate ester provides a total of 100% by weight. The carboxyl group-containing monomer may be used at a concentration of generally 50% by weight or less, preferably 20% by weight or less, more preferably 0.5 to 10% by weight.

Examples of the carboxyl group-containing monomer with a distribution index of 1 or more include methacrylic acid, crotonic acid and the compound represented by General Formula 1:

(Formula 1)

wherein $R^1$ represents a hydrogen atom or a methyl group; $R^2$ represents a hydrogen atom or a methyl group; and $R^3$ represents an alkyl group having a carboxyl group.

Examples of the any other modifier monomer include an alkyl(meth)acrylate ester, wherein the alkyl group has 1 to 3 carbon atoms, such as methyl(meth)acrylate, ethyl(meth)acrylate and isopropyl(meth)acrylate; an alkyl(meth)acrylate ester, wherein the alkyl group has 13 to 18 carbon atoms, such as tridecyl(meth)acrylate and stearyl(meth)acrylate; vinyl acetate; styrene; and vinyl toluene. Examples of the modifier monomer also include those having two or more polymerizable functional groups, such as neopentyl glycol di(meth)acrylate, hexanediol di(meth)acrylate, propylene glycol di(meth)acrylate, trimethylolpropane tri(meth)acrylate, tetramethylolmethane tetra(meth)acrylate, and dipentaerythritol hexa(meth)acrylate. The modifier monomer may be used alone, or two or more modifier monomers may be used in combination.

Any emulsifying agent that has been used in emulsion polymerization, such as an anionic emulsifying agent and a nonionic emulsifying agent, may be used without particular limitation. Examples of the emulsifying agent include an anionic emulsifying agent such as sodium lauryl sulfate, ammonium lauryl sulfate, sodium dodecylbenzene sulfonate, sodium polyoxyethylene alkyl ether sulfate, and sodium polyoxyethylene alkyl phenyl ether sulfate; and a nonionic emulsifying agent such as polyoxyethylene alkyl ether and polyoxyethylene alkyl phenyl ether. Any of the anionic and nonionic emulsifying agents may preferably be a radical-polymerizable emulsifying agent in which a reactive functional group is introduced, such as a propenyl group, an allyl group and a (meth)acryloyl group. If the radical-polymerizable emulsifying agent is used, the amount of a water-soluble component can be reduced so that the pressure-sensitive adhesive layer can contain a reduced amount of the water-extractable component. Therefore, the insulating characteristics can preferably be satisfied under humidified conditions. Some examples of such a radical-polymerizable emulsifying agent are disclosed in Japanese Patent Laid-Open Nos. H04-50204 (1992) and H04-53802 (1992).

The emulsifying agent may be used in any amount without limitation. However, a high content of the ionic emulsifying agent can degrade the insulating characteristics. For the purpose of suppressing such degradation, therefore, the emulsifying agent is preferably used in an amount of 0.3 to 5 parts by weight based on 100 parts by weight of the $C_4$ to $C_{12}$ alkyl(meth)acrylate ester as a main component. If a large amount of the emulsifying agent is used, the content of the water-soluble component may be high in the pressure-sensitive adhesive layer made of the aqueous dispersion type acrylic pressure-sensitive adhesive containing the resulting polymer emulsion, so that the insulating characteristics may tend to be degraded. Therefore, the emulsifying agent is preferably used in an amount of 3 parts by weight or less, more preferably 2 parts by weight or less. If the amount of the emulsifying agent is more than 5 parts by weight, the content of the water-extractable component can be more than 3% by weight in the pressure-sensitive adhesive layer made of the aqueous dispersion type acrylic pressure-sensitive adhesive containing the resulting polymer emulsion, so that the insulating characteristics can tend to be degraded. The emulsifying agent is preferably used in an amount of 0.5 to 3 parts by weight, more preferably 0.7 to 2 parts by weight.

In the presence of the emulsifying agent, the emulsion polymerization of the monomer may be performed according to any conventional process using an appropriate polymerization initiator to produce an aqueous dispersion of an acrylic polymer. The emulsion polymerization may be performed according to any general batch polymerization, continuous dropping polymerization, partial dropping polymerization, or the like. The polymerization may be carried out at a temperature of about 30 to about 90° C.

The emulsion polymerization is preferably performed by a process that is selected so as to produce a polymer emulsion with an average particle diameter of 0.4 μm or less. In order to produce a polymer emulsion with an average particle diameter of 0.4 μm or less, any process may be used without limitation, and examples of such a process include batch polymerization, continuous dropping polymerization and partial dropping polymerization. In such a process for emulsion polymerization, the monomer is preferably emulsified with the emulsifying agent and water to form an emulsion in advance.

The emulsion polymerization method is preferably a batch polymerization method or a partial dropping polymerization method. The batch polymerization method includes the steps of emulsifying the monomer with the emulsifying agent and water, then adding the resulting emulsion and an initiator to a polymerization vessel and performing polymerization in a batch manner. The partial dropping polymerization includes the steps of emulsifying the monomer with the emulsifying agent and water, adding part of the resulting emulsion (preferably 1 to 99% by weight of the resulting emulsion) and an initiator to a polymerization vessel, performing the first stage of polymerization, then adding an initiator to the polymerization vessel, and adding the remainder of the emulsion dropwise to the polymerization vessel so that polymerization is allowed to proceed. If the temperature of the inner bath is hard to control due to the heat generation in such polymerization processes, the continuous dropping polymerization method may preferably be used. The continuous dropping polymerization method preferably include the steps of adding, in advance to a polymerization vessel, 0.0001 to 0.1 parts by weight of the emulsifying agent and the initiator relative to 100 parts by weight of the monomer and adding an emulsion, which is prepared by emulsifying the monomer with the emulsifying agent and water, dropwise to the vessel for polymerization.

Examples of the polymerization initiator include an azo initiator such as 2,2'-azobisisobutyronitrile, 2,2'-azobis(2-amidinopropane)dihydrochloride and 2,2'-azobis(N,N'-dimethyleneisobutylamidine); a peroxodisulfate salt such as potassium peroxodisulfate and ammonium peroxodisulfate; a peroxide initiator such as benzoyl peroxide and tert-butyl hydroperoxide; and a redox initiator including peroxodisulfate salt and sodium hydrogen sulfite. If desired in the emulsion polymerization, an appropriate chain transfer agent such as mercaptans may be used to control the molecular weight of the resulting copolymer.

According to the invention, the aqueous dispersion type acrylic pressure-sensitive adhesive may contain the polymer emulsion as a base component and optionally a crosslinking agent. The crosslinking agent may be any conventional agent such as an isocyanate crosslinking agent, an epoxy crosslinking agent, an oxazoline crosslinking agent, an aziridine crosslinking agent, and a metal chelate crosslinking agent. The crosslinking agent has the effect of reacting with the functional group introduced in the polymer from the functional group-containing monomer and forming crosslinkage. The crosslinking agent also has the effect of reducing the water-soluble component, because it can react with a homopolymer contained in the polymer or copolymer emulsion. (For example, the carboxyl group-containing monomer used as the functional group-containing monomer can be less co-polymerizable in the micelle of the emulsifying agent, and therefore the carboxyl group-containing monomer can form a homopolymer or a near-homo copolymer in water.) Therefore, the crosslinking agent is preferably used to reduce the amount of the water-extractable component.

The crosslinking agent may be used in any amount without limitation. In general, the crosslinking agent is preferably used in such an amount that the equivalent ratio of the functional group introduced in the copolymer: the functional group of the crosslinking agent is about 1:0 to 0.5, preferably 1:0.001 to 0.3.

In addition, the aqueous dispersion type acrylic pressure-sensitive adhesive according to the invention may contain a tackifier or any other additive. Examples of the tackifier include a rosin resin, a terpene resin, an aliphatic petroleum resin, an aromatic petroleum resin, a copolymerized petroleum resin, an alicyclic petroleum resin, a xylene resin, and an elastomer.

According to the invention, the tape-shaped insulating material comprises an insulating substrate and a pressure-sensitive adhesive layer that is formed on one side of the substrate and made of the aqueous dispersion type acrylic pressure-sensitive adhesive. The pressure-sensitive adhesive layer is preferably controlled to contain 3% by weight or less of the water-extractable component. In the process of preparing the aqueous dispersion type acrylic pressure-sensitive adhesive, an appropriate control is performed on the type or the addition amount of the $C_4$ to $C_{12}$ alkyl (meth)acrylate ester as the main component of the monomer, the carboxyl group-containing monomer having a distribution index of 1 or more, or any other functional group-containing monomer or modifier monomer, the type or the addition amount of the emulsifying agent, or the type or the addition amount of the crosslinking agent to be added to the resulting copolymer.

Any insulating substrate may be used without limitation. Examples of the insulating substrate include a simple substrate or a composite substrate such as a film of a plastic such as polyester and polypropylene; paper; non-woven fabric; of heat-resisting polyimide, polyamide or polyacetate; and any of the above substrates impregnated with an epoxy resin or the like as needed.

The pressure-sensitive adhesive layer may be formed by a process including the steps of applying the aqueous dispersion type acrylic pressure-sensitive adhesive directly onto the insulating substrate and drying the adhesive or by a process including the steps of forming a layer on a separator similarly to the above and transferring the layer onto the insulating substrate. The tape-shaped insulating material according to the invention can be produced in the form of a sheet or a tape by forming one or more pressure-sensitive adhesive layers on one side or both sides of the insulating substrate.

The tape-shaped insulating material according to the invention may preferably be used for a variety of electronic components and may be attached to electronic components to form new electronic components. Examples of such electronic components include but are not limited to transformers with an interlayer insulation or armor insulation.

EXAMPLE

The invention is more specifically described by showing the examples below. However, such examples are not intended to limit the scope of the invention. Hereinafter, the term "part(s)" means "part(s) by weight."

The methods as described below were used to determine the average emulsion particle diameter of each aqueous dispersion type acrylic pressure-sensitive adhesive obtained in each example or comparative example, the amount of the water-extractable component in each pressure-sensitive adhesive layer obtained in each example or comparative example, and the electrolytic corrosion coefficient (insulating characteristic) and the adhesive strength of each tape-shaped insulating material obtained in each example or comparative example.

[Average Particle Diameter of Emulsion Particles]

A laser diffraction/scattering particle size distribution analyzer LA-90 (Horiba Ltd.) was used under the conditions of a data processing unit: SD-21; particle diameter basis: volume basis; and index of refraction: 1.20-0.00i. The average size value on the display of the data processing unit was used as the average particle diameter.

[Amount of Water-Extractable Component]

The aqueous dispersion type acrylic pressure-sensitive adhesive composition was applied onto a repellent-treated film and then dried at 140° C. for three minutes and aged at 80° C. for seven days. About 100 mg (w1 g) of the resulting solid material was taken. To the solid material was added 3 ml of tetrahydrofuran and allowed to stand for 12 hours. About 40 ml of distilled water was added thereto so that water-insoluble components were precipitated. The aqueous solution was taken out by decantation, and the solvent was removed by heat. Distilled water was added to the resulting solid matter, and water-soluble components were extracted with the water. The water extract was dried at 130° C. for two hours, and the water-extracted component was measured for weight (a2 g). According to the formula below, the amount of the water-extractable component was calculated from the above w1 and w2.

Amount of Water-Extractable Component (% by weight)=(w2/w1)×100

[Electrolytic Corrosion Coefficient (Insulating Characteristic)]

The electrolytic corrosion coefficient was determined according to JIS C-2338, which defines the method of testing a pressure-sensitive adhesive tape of an electrically insulating polyester film.

[Adhesive Strength]

According to JIS Z-0237, the tape-shaped insulating material was attached to a stainless steel plate, and a peel force was measured (180 degree peel, a peeling rate of 300 mm/minute).

Example 1-1

To a reaction vessel equipped with a cooling tube, a nitrogen-introducing tube, a thermometer, and a stirrer were added 30 parts of water and 0.1 parts of potassium peroxodisulfate, and the atmosphere was replaced with nitrogen for one hour under stirring. With 70 parts of water, 96 parts of butyl acrylate, 4 parts of acrylic acid and 0.6 parts of ammonium polyoxyethylene nonyl phenyl ether sulfate as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

With the copolymer emulsion was mixed 0.5 parts (in terms of solid content) of an oxazoline group-containing water-soluble crosslinking agent (Epocros WS-500 (trade name of Nippon Shokubai Co., Ltd.) with an oxazoline group equivalent of 220 g·solid/eq.), based on 100 parts of the solid content of the copolymer emulsion (the water-dispersed copolymer), so that an aqueous dispersion type acrylic pressure-sensitive adhesive was prepared. The equivalent number of the oxazoline group of the water-soluble crosslinking agent was 0.041 based on 1 equivalent of the carboxyl group contained in the water-dispersed copolymer. The aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Example 1-2

To a reaction vessel equipped with a cooling tube, a nitrogen-introducing tube, a thermometer, and a stirrer were added 30 parts of water and 0.1 parts of 2,2'-azobis(2-amidinopropane)dihydrochloride, and the atmosphere was replaced with nitrogen for one hour under stirring. With 70 parts of water, 95 parts of butyl acrylate, 5 parts of acrylic acid and 1.5 parts (in terms of solid content) of a reactive emulsifying agent (Aquaron BC2020 (trade name of Dai-Ichi Kogyo Seiyaku Co., Ltd.) hereinafter abbreviated as "BC2020") in which one propenyl group is added to the phenyl group of ammonium polyoxyethylene alkyl phenyl ether sulfate (an adduct of 20 mol ethylene oxide) were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

With the copolymer emulsion was mixed 0.7 parts (in terms of solid content) of an oxazoline group-containing water-soluble crosslinking agent (Epocros WS-500 (trade name of Nippon Shokubai Co., LTD.) with an oxazoline group equivalent of 220 g·solid/eq.), based on 100 parts of the solid content of the copolymer emulsion (the water-dispersed copolymer), so that an aqueous dispersion type acrylic pressure-sensitive adhesive was prepared. The equivalent number of the oxazoline group of the water-soluble crosslinking agent was 0.046 based on 1 equivalent of the carboxyl group contained in the water-dispersed copolymer. The aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Example 1-3

To a reaction vessel equipped with a cooling tube, a nitrogen-introducing tube, a thermometer, and a stirrer were added 30 parts of water and 0.1 parts of ammonium peroxodisulfate, and the atmosphere was replaced with nitrogen for one hour under stirring. With 70 parts of water, 94 parts of butyl acrylate, 6 parts of methacrylic acid and 3 parts (in terms of solid content) of BC2020 as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

With the copolymer emulsion was mixed 0.2 parts (in terms of solid content) of an oil-soluble epoxy crosslinking agent (Tetrad-C (trade name of Mitsubishi Gas Chemical Company, Inc.) with an epoxy group equivalent of 9.15 g·solid/eq.) dissolved in toluene, based on 100 parts of the solid content of the copolymer emulsion (the water-dispersed copolymer), so that an aqueous dispersion type acrylic pressure-sensitive adhesive was prepared. The equivalent number of the epoxy group of the oil-soluble crosslinking agent was 0.031 based on 1 equivalent of the carboxyl group contained in the water-dispersed copolymer. The aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Example 1-4

To a reaction vessel equipped with a cooling tube, a nitrogen-introducing tube, a thermometer, and a stirrer were added 30 parts of water and 0.1 parts of ammonium peroxodisulfate, and the atmosphere was replaced with nitrogen for one hour under stirring. With 70 parts of water, 97 parts of butyl acrylate, 3 parts of acrylic acid and 1.5 parts (in terms of solid content) of BC2020 as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

The resulting aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Example 1-5

To a reaction vessel equipped with a cooling tube, a nitrogen-introducing tube, a thermometer, and a stirrer were added 30 parts of water and 0.1 parts of ammonium peroxodisulfate, and the atmosphere was replaced with nitrogen for one hour under stirring. With 70 parts of water, 94 parts of butyl acrylate, 6 parts of methacrylic acid and 5 parts of ammonium polyoxyethylene nonyl phenyl ether sulfate as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

With the copolymer emulsion was mixed 0.2 parts (in terms of solid content) of an oil-soluble epoxy crosslinking agent (Tetrad-C (trade name of Mitsubishi Gas Chemical Company, Inc.) with an epoxy group equivalent of 91.5 g·solid/eq.) dissolved in toluene, based on 100 parts of the solid content of the copolymer emulsion (the water-dispersed copolymer), so that an aqueous dispersion type acrylic pressure-sensitive adhesive was prepared. The equivalent number of the epoxy group of the oil-soluble crosslinking agent was 0.031 based on 1 equivalent of the carboxyl group contained in the water-dispersed copolymer. The aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Example 1-6

To a reaction vessel equipped with a cooling tube, a nitrogen-introducing tube, a thermometer, and a stirrer were added 30 parts of water and 0.1 parts of 2,2'-azobis(2-amidinopropane)dihydrochloride, and the atmosphere was replaced with nitrogen for one hour under stirring. With 70 parts of water, 95 parts of butyl acrylate, 5 parts of acrylic acid and 3 parts of ammonium polyoxyethylene nonyl phenyl ether sulfate as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

The resulting aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Comparative Example 1-1

To a vessel were added 100 parts of a natural rubber latex and a hydrogenated rosin ester emulsion (an emulsion of 50 parts of a hydrogenated rosin ester, 7 parts of ammonium polyoxyethylene nonyl phenyl ether sulfate and 50 parts of water) and stirred to form a natural rubber latex preparation. The natural rubber latex preparation was applied onto one side of a polyester film (25 μm in thickness) so as to have a thickness of 30 μm after drying and dried at 140° C. for three minutes and aged at 80° C. for seven days, so that a tape-shaped insulating material was produced.

Comparative Example 1-2

The process of Example 1-1 was used to form a copolymer emulsion except that the ammonium polyoxyethylene nonyl phenyl ether sulfate was used in an amount of 7 parts. The process of Example 1-1 was used to produce an aqueous dispersion type acrylic pressure-sensitive adhesive and a tape-shaped insulating material.

The measurements were performed on the average emulsion particle diameter of each aqueous dispersion type acrylic pressure-sensitive adhesive obtained in each of Examples 1-1 to 1-6 and Comparative Examples 1-1 and 1-2, the amount of the water-extractable component in each pressure-sensitive adhesive layer, and the electrolytic corrosion coefficient (insulating characteristic) and the adhesive strength of each tape-shaped insulating material. The results are shown in Table 1.

TABLE 1

| | Average Particle Diameter (μm) | Amount of Water-Extractable Component (% by weight) | Electrolytic Corrosion Coefficient | Adhesive Strength (N/20 mm) |
| --- | --- | --- | --- | --- |
| Example 1-1 | 0.69 | 0.86 | 0.996 | 4.5 |
| Example 1-2 | 0.49 | 0.15 | 1.000 | 5.2 |
| Example 1-3 | 0.23 | 0.08 | 1.000 | 4.9 |
| Example 1-4 | 0.51 | 0.95 | 0.994 | 4.2 |
| Example 1-5 | 0.21 | 2.95 | 0.983 | 4.4 |
| Example 1-6 | 0.24 | 1.89 | 0.986 | 4.2 |
| Comparative Example 1-1 | 0.88 | 6.58 | 0.945 | 5.9 |
| Comparative Example 1-2 | 0.19 | 3.31 | 0.963 | 4.3 |

Table 1 shows that the tape-shaped insulating material of each example contains no more than 3% by weight of the water-extractable component in the pressure-sensitive adhesive layer. From each electrolytic corrosion coefficient according to JIS C-2338 of no less than 0.98, it is apparent that each tape-shaped insulating material according to the invention has a high electrolytic corrosion coefficient and good insulating characteristics.

Example 2-1

To a reaction vessel equipped with a cooling tube, a nitrogen-introducing tube, a thermometer, and a stirrer were added 30 parts of water and 0.1 parts of 2,2'-azobis(2-amidinopropane)dihydrochloride, and the atmosphere was replaced with nitrogen for one hour under stirring. With 70 parts of water, 97 parts of butyl acrylate, 3 parts of methacrylic acid (with a distribution index of 1.90) and 1.5 parts of ammonium polyoxyethylene nonyl phenyl ether sulfate as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

With the copolymer emulsion was mixed 0.1 parts (in terms of solid content) of an oxazoline group-containing water-soluble crosslinking agent (Epocros WS-500 (trade name of Nippon Shokubai Co., Ltd.) with an oxazoline group equivalent of 220 g·solid/eq.), based on 100 parts of the solid content of the copolymer emulsion (the water-dispersed copolymer), so that an aqueous dispersion type acrylic pressure-sensitive adhesive was prepared. The aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Example 2-2

To a reaction vessel equipped with a cooling tube, a nitrogen-introducing tube, a thermometer, and a stirrer were added 30 parts of water and 0.1 parts of 2,2'-azobis(2-amidinopropane)dihydrochloride, and the atmosphere was replaced with nitrogen for one hour under stirring. With 70 parts of water, 70 parts of butyl acrylate, 26 parts of 2-ethylhexyl acrylate, 4 parts of methacrylic acid, and 1.5 parts (in terms of solid content) of ammonium polyoxyethylene nonyl phenyl ether sulfate as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

The resulting aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Example 2-3

To a reaction vessel equipped with a cooling tube, a nitrogen-introducing tube, a thermometer, and a stirrer were added 30 parts of water and 0.1 parts of ammonium peroxodisulfate, and the atmosphere was replaced with nitrogen for one hour under stirring. With 70 parts of water, 95 parts of butyl acrylate, 5 parts of methacrylic acid and 1.5 parts (in terms of solid content) of BC2020 as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

With the copolymer emulsion was mixed 0.1 parts (in terms of solid content) of an oil-soluble epoxy crosslinking agent (Tetrad-C (trade name of Mitsubishi Gas Chemical Company, Inc.) with an epoxy group equivalent of 91.5 g·solid/eq.) dissolved in toluene, based on 100 parts of the solid content of the copolymer emulsion (the water-dispersed copolymer), so that an aqueous dispersion type acrylic pressure-sensitive adhesive was prepared. The aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Example 2-4

To a reaction vessel equipped with a cooling tube, a nitrogen-introducing tube, a thermometer, and a stirrer were added 30 parts of water and 0.1 parts of potassium peroxodisulfate, and the atmosphere was replaced with nitrogen for one hour under stirring. With 70 parts of water, 95 parts of 2-ethylhexyl acrylate, 5 parts of methacrylic acid and 1.5 parts (in terms of solid content) of BC2020 as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

With the copolymer emulsion was mixed 0.1 parts (in terms of solid content) of an oil-soluble epoxy crosslinking agent (Tetrad-C (trade name of Mitsubishi Gas Chemical Company, Inc.) with an epoxy group equivalent of 91.5 g·solid/eq.) dissolved in toluene, based on 100 parts of the solid content of the copolymer emulsion (the water-dispersed copolymer), so that an aqueous dispersion type acrylic pressure-sensitive adhesive was prepared. The aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Example 2-5

To a reaction vessel equipped with a cooling tube, a nitrogen-introducing tube, a thermometer, and a stirrer were added 30 parts of water and 0.1 parts of ammonium peroxodisulfate, and the atmosphere was replaced with nitrogen for one hour under stirring. With 70 parts of water, 90 parts of 2-ethylhexyl acrylate, 10 parts of methacrylic acid and 1.5 parts (in terms of solid content) of Aquaron BC2020 were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8, resulting in a copolymer emulsion.

With the copolymer emulsion was mixed 0.1 parts (in terms of solid content) of an oxazoline group-containing water-soluble crosslinking agent (Epocros WS-500 (trade name of Nippon Shokubai Co., LTD.) with an oxazoline group equivalent of 220 g·solid/eq.), based on 100 parts of the solid content of the copolymer emulsion (the water-dispersed copolymer), so that an aqueous dispersion type acrylic pressure-sensitive adhesive was prepared. The aqueous dispersion type acrylic pressure-sensitive adhesive was then applied onto one side of a polyester film (25 μm in thickness) so as to have a thickness of 30 μm after drying and dried at 140° C. for three minutes and aged at 80° C. for seven days, so that a tape-shaped insulating material was produced.

Comparative Example 2-1

The process of Example 2-3 was used to form a copolymer emulsion except that maleic acid (with a distribution index of 0.50) was used in place of methacrylic acid. The process of Example 2-3 was used to produce an aqueous dispersion type acrylic pressure-sensitive adhesive and a tape-shaped insulating material.

Comparative Example 2-2

The process of Example 2-3 was used to form a copolymer emulsion except that acrylic acid (with a distribution index of 0.74) was used in place of methacrylic acid. The process of Example 2-3 was used to produce an aqueous dispersion type acrylic pressure-sensitive adhesive and a tape-shaped insulating material.

The measurements were performed on the average emulsion particle diameter of each aqueous dispersion type acrylic pressure-sensitive adhesive obtained in each of Examples 2-1 to 2-5 and Comparative Examples 2-1 and 2-2, the amount of the water-extractable component in each pressure-sensitive adhesive layer, and the electrolytic corrosion coefficient (insulating characteristic) and the adhesive strength of each tape-shaped insulating material. The results are shown in Table 2. The distribution index of the carboxyl group-containing monomer was obtained by the method as shown below.

(Calculation of Distribution Index)

A three materials mixture of 10 g of the carboxyl group-containing monomer, 10 g of distilled water and 10 g of toluene was prepared and vigorously shaken for five minutes. After the mixture was allowed to stand for 12 hours, the water and toluene solutions were separated from each other, and the weight of the water solution (w1 g) and the weight of the toluene solution (w2 g) were measured. The distribution index was calculated from the above w1 and w2 according to the following formula: Distribution Index=w2/w1. A series of steps were carried out at 25° C. When the carboxyl group-containing monomer was solid at 25° C., the three materials were mixed as shown above and then dissolved by heat. When the monomer was recrystallized, the weight of the toluene solution was measured as it was, and the weight of the water solution was calculated by subtracting the weight of the toluene solution from the total weight.

The methacrylic acid used in Examples 2-1 to 2-5 had a distribution index of 1.90. The maleic acid used in Comparative Example 2-1 had a distribution index of 0.50. The acrylic acid used in Comparative Example 2-2 had a distribution index of 0.74.

TABLE 2

|  | Average Particle Diameter (μm) | Amount of Water-Extractable Component (% by weight) | Electrolytic Corrosion Coefficient | Adhesive Strength (N/20 mm) |
| --- | --- | --- | --- | --- |
| Example 2-1 | 0.52 | 0.77 | 1.000 | 4.2 |
| Example 2-2 | 0.50 | 0.81 | 1.000 | 4.5 |
| Example 2-3 | 0.48 | 0.08 | 0.998 | 5.3 |
| Example 2-4 | 0.50 | 0.07 | 0.993 | 5.1 |
| Example 2-5 | 0.57 | 0.06 | 0.991 | 5.5 |
| Comparative Example 2-1 | 0.51 | 3.46 | 0.785 | 5.8 |
| Comparative Example 2-2 | 0.56 | 4.50 | 0.864 | 6.0 |

In each Example, the carboxyl group-containing monomer (methacrylic acid) with a distribution index of not less than 1 is used to form the polymer emulsion to be contained in the aqueous dispersion type acrylic pressure-sensitive adhesive for the pressure-sensitive adhesive layer of the tape-shaped insulating material. In contrast, the carboxyl group-containing monomer used in each Comparative Example has a distribution index of less than 1. From Table 2 showing each electrolytic corrosion coefficient according to JIS C-2338 of no less than 0.98, it is apparent that each tape-shaped insulating material according to the invention has a high electrolytic corrosion coefficient and good insulating characteristics.

Example 3-1

With 100 parts of water, 96 parts of 2-ethylhexyl acrylate, 4 parts of methacrylic acid and 1.5 parts (in terms of solid content) of BC2020 as an emulsifying agent were emulsified to form an emulsion. To a reaction vessel equipped with a cooling tube, a nitrogen-introducing tube, a thermometer, and a stirrer were added the whole of the emulsion and 0.2 parts of 2,2'-azobis(2-amidinopropane)dihydrochloride, and the atmosphere was replaced with nitrogen for one hour under stirring. After batch polymerization was performed at 60° C. for three hours, aging was performed at 60° C. for two hours. The product was then cooled to room temperature and adjusted using an aqueous 10% by weight ammonia to have a pH of 8 and resulted in a copolymer emulsion, which was used as an aqueous dispersion type acrylic pressure-sensitive adhesive.

The aqueous dispersion type acrylic pressure-sensitive adhesive was then applied onto one side of a polyester film (25 μm in thickness) so as to have a thickness of 30 μm after drying and dried at 140° C. for three minutes, so that a tape-shaped insulating material was produced.

Example 3-2

To a reaction vessel equipped with a cooling tube, a nitrogen-introducing tube, a thermometer, and a stirrer were added 30 parts of water, 0.015 parts (in terms of solid content) of BC2020 as an emulsifying agent and 0.2 parts of 2,2'-azobis(2-amidinopropane)dihydrochloride, and the atmosphere was replaced with nitrogen for one hour under stirring. With 70 parts of water, 96 parts of 2-ethylhexyl acrylate, 4 parts of methacrylic acid, and 1.5 parts (in terms of solid content) of BC2020 were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8 and resulted in a copolymer emulsion, which was used as an aqueous dispersion type acrylic pressure-sensitive adhesive.

The aqueous dispersion type acrylic pressure-sensitive adhesive was then applied onto one side of a polyester film (25 μm in thickness) so as to have a thickness of 30 μm after drying and dried at 140° C. for three minutes, so that a tape-shaped insulating material was produced.

Example 3-3

To a reaction vessel equipped with a cooling tube, a nitrogen-introducing tube, a thermometer, and a stirrer were added 30 parts of water, 0.001 parts (in terms of solid content) of BC2020 as an emulsifying agent and 0.1 parts of ammonium peroxodisulfate, and the atmosphere was replaced with nitrogen for one hour under stirring. With 70 parts of water, 95 parts of n-butyl acrylate, 5 parts of methacrylic acid, and 1.5 parts (in terms of solid content) of BC2020 were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8 and resulted in a copolymer emulsion, which was used as an aqueous dispersion type acrylic pressure-sensitive adhesive.

The aqueous dispersion type acrylic pressure-sensitive adhesive was then applied onto one side of a polyester film (25 μm in thickness) so as to have a thickness of 30 μm after drying and dried at 140° C. for three minutes, so that a tape-shaped insulating material was produced.

Example 3-4

To a reaction vessel equipped with a cooling tube, a nitrogen-introducing tube, a thermometer, and a stirrer were added 30 parts of water, 0.005 parts (in terms of solid content) of BC2020 as an emulsifying agent and 0.1 parts of ammonium peroxodisulfate, and the atmosphere was replaced with nitrogen for one hour under stirring. With 70 parts of water, 70 parts of n-butyl acrylate, 21 parts of 2-ethylhexyl acrylate, 9 parts of methacrylic acid, and 1.5 parts (in terms of solid content) of BC2020 were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8 and resulted in a copolymer emulsion, which was used as an aqueous dispersion type acrylic pressure-sensitive adhesive.

The aqueous dispersion type acrylic pressure-sensitive adhesive was then applied onto one side of a polyester film (25 μm in thickness) so as to have a thickness of 30 μm after drying and dried at 140° C. for three minutes, so that a tape-shaped insulating material was produced.

Example 3-5

The process of Example 3-3 was used to form a copolymer emulsion. With the copolymer emulsion was mixed 0.1 parts (in terms of solid content) of an oil-soluble epoxy crosslinking agent (Tetrad-C (trade name of Mitsubishi Gas Chemical Company, Inc.) with an epoxy group equivalent of 9.15 g·solid/eq.) dissolved in toluene, based on 100 parts of the solid content of the copolymer emulsion (the water-dispersed copolymer), so that an aqueous dispersion type acrylic pressure-sensitive adhesive was prepared.

The aqueous dispersion type acrylic pressure-sensitive adhesive was then applied onto one side of a polyester film (25 μm in thickness) so as to have a thickness of 30 μm after drying and dried at 140° C. for three minutes, so that a tape-shaped insulating material was produced.

Example 3-6

The process of Example 3-3 was used to form a copolymer emulsion. With the copolymer emulsion was mixed 0.1 parts (in terms of solid content) of an oxazoline group-containing water-soluble crosslinking agent (Epocros WS-500 (trade name of Nippon Shokubai Co., LTD.) with an oxazoline group equivalent of 220 g·solid/eq.), based on 100 parts of the solid content of the copolymer emulsion (the water-dispersed copolymer), so that an aqueous dispersion type acrylic pressure-sensitive adhesive was prepared.

The aqueous dispersion type acrylic pressure-sensitive adhesive was then applied onto one side of a polyester film (25 μm in thickness) so as to have a thickness of 30 μm after drying and dried at 140° C. for three minutes, so that a tape-shaped insulating material was produced.

Example 3-7

With 100 parts of water, 96 parts of 2-ethylhexyl acrylate, 4 parts of methacrylic acid and 1.5 parts (in terms of solid content) of BC2020 as an emulsifying agent were emulsified to form an emulsion. To a reaction vessel equipped with a cooling tube, a nitrogen-introducing tube, a thermometer, and a stirrer were added 20% by weight of the emulsion and 0.2 parts of 2,2'-azobis(2-amidinopropane)dihydrochloride, and the atmosphere was replaced with nitrogen for one hour under stirring. The first stage of polymerization was then carried out at 60° C. for two hours. The remainder 80% by weight of the emulsion was added dropwise at 60° C. over three hours so that partial-dropping polymerization was performed, and then aging was performed at 60° C. for two hours. The product was then cooled to room temperature and adjusted using an aqueous 10% by weight ammonia to have a pH of 8 and resulted in a copolymer emulsion, which was used as an aqueous dispersion type acrylic pressure-sensitive adhesive.

The aqueous dispersion type acrylic pressure-sensitive adhesive was then applied onto one side of a polyester film (25 μm in thickness) so as to have a thickness of 30 μm after drying and dried at 140° C. for three minutes, so that a tape-shaped insulating material was produced.

Comparative Example 3-1

To a reaction vessel equipped with a cooling tube, a nitrogen-introducing tube, a thermometer, and a stirrer were added 30 parts of water and 0.2 parts of 2,2'-azobis(2-amidinopropane)dihydrochloride, and the atmosphere was replaced with nitrogen for one hour under stirring. With 70 parts of water, 96 parts of 2-ethylhexyl acrylate, 4 parts of methacrylic acid, and 1.5 parts (in terms of solid content) of BC2020 as an emulsifying agent were emulsified to form an emulsion. The emulsion was added dropwise to the reaction vessel at 60° C. over three hours and then aged at 60° C. for two hours. Thereafter, the product was cooled to room temperature and adjusted using an aqueous 10% by weight ammonia to have a pH of 8 and resulted in a copolymer emulsion, which was used as an aqueous dispersion type acrylic pressure-sensitive adhesive.

The aqueous dispersion type acrylic pressure-sensitive adhesive was then applied onto one side of a polyester film (25 μm in thickness) so as to have a thickness of 30 μm after drying and dried at 140° C. for three minutes, so that a tape-shaped insulating material was produced.

Comparative Example 3-2

To a reaction vessel equipped with a cooling tube, a nitrogen-introducing tube, a thermometer, and a stirrer were added 30 parts of water and 0.1 parts of ammonium peroxodisulfate, and the atmosphere was replaced with nitrogen for one hour under stirring. With 70 parts of water, 95 parts of n-butyl acrylate, 5 parts of methacrylic acid, and 1.5 parts (in terms of solid content) of BC2020 as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8 and resulted in a copolymer emulsion, which was used as an aqueous dispersion type acrylic pressure-sensitive adhesive.

The aqueous dispersion type acrylic pressure-sensitive adhesive was then applied onto one side of a polyester film (25 μm in thickness) so as to have a thickness of 30 μm after drying and dried at 140° C. for three minutes, so that a tape-shaped insulating material was produced.

Comparative Example 3-3

To a reaction vessel equipped with a cooling tube, a nitrogen-introducing tube, a thermometer, and a stirrer were added 30 parts of water and 0.1 parts of ammonium peroxodisulfate, and the atmosphere was replaced with nitrogen for one hour under stirring. With 70 parts of water, 70 parts of n-butyl acrylate, 21 parts of 2-ethylhexyl acrylate, 9 parts of methacrylic acid, and 1.5 parts (in terms of solid content) of BC2020 as an emulsifying agent were emulsified to form an emulsion. The emulsion was added dropwise to the reaction vessel at 70° C. over three hours and then aged at 70° C. for two hours. Thereafter, the product was cooled to room temperature and adjusted using an aqueous 10% by weight ammonia to have a pH of 8 and resulted in a copolymer emulsion, which was used as an aqueous dispersion type acrylic pressure-sensitive adhesive.

The aqueous dispersion type acrylic pressure-sensitive adhesive was then applied onto one side of a polyester film (25 μm in thickness) so as to have a thickness of 30 μm after drying and dried at 140° C. for three minutes, so that a tape-shaped insulating material was produced.

The measurements were performed on the average emulsion particle diameter of each aqueous dispersion type acrylic pressure-sensitive adhesive obtained in each of Examples 3-1 to 3-7 and Comparative Examples 3-1 to 3-3, the amount of the water-extractable component in each pressure-sensitive adhesive layer, and the electrolytic corrosion coefficient (insulating characteristic) and the adhesive strength of each tape-shaped insulating material. The results are shown in Table 3.

TABLE 3

| | Average Particle Diameter (μm) | Amount of Water-Extractable Component (% by weight) | Electrolytic Corrosion Coefficient | Adhesive Strength (N/20 mm) |
| --- | --- | --- | --- | --- |
| Example 3-1 | 0.15 | 0.08 | 1.000 | 4.3 |
| Example 3-2 | 0.24 | 0.08 | 1.000 | 4.2 |
| Example 3-3 | 0.27 | 0.09 | 0.991 | 5.2 |
| Example 3-4 | 0.25 | 0.09 | 1.000 | 5.7 |
| Example 3-5 | 0.27 | 0.08 | 0.995 | 5.1 |
| Example 3-6 | 0.27 | 0.08 | 0.996 | 5.1 |
| Example 3-7 | 0.20 | 0.07 | 1.000 | 4.5 |
| Comparative Example 3-1 | 0.55 | 0.08 | 0.863 | 4.4 |
| Comparative Example 3-2 | 0.46 | 0.08 | 0.895 | 4.9 |
| Comparative Example 3-3 | 0.45 | 0.09 | 0.911 | 5.6 |

Table 3 shows that in each Example without any severe aging condition, each polymer emulsion has an average particle diameter of no more than 0.4 μm in the aqueous dispersion type acrylic pressure-sensitive adhesive for the pressure-sensitive adhesive layer of the tape-shaped insulating material. From each electrolytic corrosion coefficient according to JIS C-2338 of no less than 0.98, it is apparent that each tape-shaped insulating material according to the invention has a high electrolytic corrosion coefficient and good insulating characteristics.

INDUSTRIAL APPLICABILITY

The tape-shaped insulating material according to the invention has a pressure-sensitive adhesive layer with good insulating characteristics and can be used as an interlayer or armor insulation for electrical or electronic components such as transformers and coils, and the like to make them insulated products. Therefore, the invention has a high industrial applicability.

The invention claimed is:

1. A tape-shaped insulating material, comprising an insulating substrate and a pressure-sensitive adhesive layer provided on one side or both sides of the substrate,
    wherein the pressure-sensitive adhesive layer is made of an aqueous dispersion type acrylic pressure-sensitive adhesive containing a crosslinking agent and a polymer emulsion that is a product of emulsion polymerization of monomer subunits in the presence of an emulsifying agent, wherein the monomer subunits of said polymer emulsion contain an alkyl (meth)acrylate ester monomer wherein the alkyl group has 4 to 12 carbon atoms, and a carboxylic acid monomer, wherein the crosslinking agent is an oxazoline crosslinking agent; and
    the tape-shaped insulating material has an electrolytic corrosion coefficient of 0.98 or more,
    wherein the carboxyl group-containing monomer has a distribution index of 1 or more, wherein the distribution index represents a weight ratio of a toluene solution of the carboxyl group-containing monomer to a water solution of the carboxyl group-containing monomer after the toluene, the water and the carboxyl group-containing monomer each having the same weight are mixed.

2. The tape-shaped insulating material according to claim 1, wherein the pressure-sensitive adhesive layer contains 3% by weight or less of a water-extractable component.

3. The tape-shaped insulating material according to claim 1, wherein the carboxyl group-containing monomer having a distribution index of 1 or more is methacrylic acid.

4. The tape-shaped insulating material according to claim 1, wherein the polymer emulsion contained in the aqueous dispersion type acrylic pressure-sensitive adhesive has an average particle diameter of 0.4 μm or less.

5. The tape-shaped insulating material according to claim 1, wherein the emulsifying agent is used in an amount of 0.3 to 5 parts by weight based on 100 parts by weight of the monomer.

6. The tape-shaped insulating material according to claim 1, wherein the emulsifying agent is a radical-polymerizable emulsifying agent.

7. An insulated product, comprising the tape-shaped insulating material according to claim 1.

8. The tape-shaped insulating material of claim 1, wherein the polymer of said polymer emulsion contains 80% by weight or more of the alkyl (meth)acrylate ester monomer.

9. The tape-shaped insulating material of claim 1, wherein the polymer of said polymer emulsion contains 90% to 99.5% by weight of the alkyl (meth)acrylate ester monomer.

10. The tape-shaped insulating material of claim 1, wherein said aqueous dispersion type acrylic pressure-sensitive adhesive consists of said crosslinking agent and said polymer emulsion.

11. A method for producing a tape-shaped insulating material of claim 1, comprising:
    emulsion polymerizing monomer subunits in the presence of an emulsifying agent to produce a polymer emulsion, wherein the monomer subunits of said polymer emulsion contain an alkyl (meth)acrylate ester monomer, wherein the alkyl group has 4 to 12 carbon atoms, and a carboxyl group-containing monomer having a distribution index of 1 or more;
    producing an aqueous dispersion type acrylic pressure-sensitive adhesive using said polymer emulsion and a cross-linking agent, wherein the crosslinking agent is an oxazoline crosslinking agent; and
    forming a pressure-sensitive adhesive layer containing said acrylic pressure-sensitive adhesive on one side or both sides of an insulating substrate to produce a tape-shaped insulating material.

12. The method of claim 11, wherein said aqueous dispersion type acrylic pressure-sensitive adhesive consists of said crosslinking agent and said polymer emulsion.

* * * * *

UNITED STATES PATENT AND TRADEMARK OFFICE
CERTIFICATE OF CORRECTION

PATENT NO. : 7,332,219 B2  Page 1 of 1
APPLICATION NO. : 10/485019
DATED : February 19, 2008
INVENTOR(S) : Mitsuyoshi Shirai et al.

It is certified that error appears in the above-identified patent and that said Letters Patent is hereby corrected as shown below:

At Column 5, Line 40, please delete "99.9%" and insert --99.5%--, therefor.

At Column 9, Line 29 (approximately), please delete "EXAMPLE" and insert --EXAMPLES--, therefor.

At column 10, Line 1, please delete "(a2 g)." and insert --(w2 g).--, therefor.

Signed and Sealed this

Fourteenth Day of October, 2008

JON W. DUDAS
*Director of the United States Patent and Trademark Office*